(12) United States Patent
Kobayashi et al.

(10) Patent No.: US 8,587,805 B2
(45) Date of Patent: Nov. 19, 2013

(54) EXECUTION LOG GENERATION APPARATUS AND METHOD

(75) Inventors: Akio Kobayashi, Kawasaki (JP);
Kazumasa Taneike, Kawasaki (JP);
Masahiko Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1195 days.

(21) Appl. No.: 12/457,515

(22) Filed: Jun. 12, 2009

(65) Prior Publication Data
US 2009/0251731 A1 Oct. 8, 2009

Related U.S. Application Data

(63) Continuation of application No. PCT/JP2006/324965, filed on Dec. 14, 2006.

(51) Int. Cl.
*G06F 3/12* (2006.01)
*G06Q 30/00* (2012.01)
*G06Q 20/00* (2012.01)

(52) U.S. Cl.
USPC ............... 358/1.15; 705/75; 705/14.38

(58) Field of Classification Search
USPC ........ 358/1.15; 707/200, 202; 705/45, 43, 10, 705/21, 16, 26, 14, 75
See application file for complete search history.

(56) References Cited

U.S. PATENT DOCUMENTS

| | | | |
|---|---|---|---|
| 6,119,117 A | 9/2000 | Yoda et al. | 707/10 |
| 7,542,919 B1 * | 6/2009 | Mueller et al. | 705/16 |
| 7,714,729 B2 * | 5/2010 | Pape et al. | 340/573.3 |
| 8,103,520 B2 * | 1/2012 | Mueller et al. | 705/1.1 |
| 2002/0165821 A1 * | 11/2002 | Tree | 705/39 |
| 2004/0117261 A1 * | 6/2004 | Walker et al. | 705/14 |
| 2004/0236632 A1 * | 11/2004 | Maritzen et al. | 705/26 |
| 2005/0033647 A1 * | 2/2005 | Crisp, III | 705/16 |
| 2005/0108168 A1 * | 5/2005 | Halpin et al. | 705/45 |

(Continued)

FOREIGN PATENT DOCUMENTS

| | | |
|---|---|---|
| JP | 8-179896 | 7/1996 |
| JP | 11-39293 | 2/1999 |
| JP | 11-136428 | 5/1999 |

(Continued)

OTHER PUBLICATIONS

International Search Report for PCT/JP2006/324965, mailed Jan. 23, 2007.

*Primary Examiner* — Jerome Grant, II
(74) *Attorney, Agent, or Firm* — Staas & Halsey LLP

(57) ABSTRACT

An execution log generation apparatus generates an execution log upon receiving, for each job operation, job operation data indicating content of a job operation performed in a job procedure from a job processing apparatus that performs job processes through job procedures. The execution log generation apparatus includes a definition file holding unit that holds a definition file in which job operations performed in the job procedures are defined along a flow of the job processes and the job procedures, and in which output items to be output as execution logs for the each job operation are listed in a common format; and an execution log output unit that selects, from the definition file, an output item corresponding to a job operation contained in the job operation data, and outputs, as an execution log, the same output item as the selected output item from the job operation data.

9 Claims, 8 Drawing Sheets

```
<JOB PROCEDURE name=ENTRY OF ORDER>
  <JOB OPERATION name=REQUEST FOR APPROVAL>
    <PROCESSED DATE AND TIME>2006/09/25 13:12:11</PROCESSED DATE AND TIME>
    <SLIP DATE>2006/09/25</SLIP DATE>
    <APPROVED DATE>2006/09/25</APPROVED DATE>
    <SLIP ISSUER>00998877</SLIP ISSUER>
    <APPROVER>00886655</APPROVER>
    <SECTOR CODE>4708</SECTOR CODE>
    <PRICE>100,000 YEN</PRICE>
  </JOB OPERATION>
</JOB PROCEDURE>
      .
```

(56) References Cited

U.S. PATENT DOCUMENTS

| | | |
|---|---|---|
| 2008/0005192 A1* | 1/2008 | Jung et al. .................. 707/202 |
| 2009/0077136 A1* | 3/2009 | Igawa et al. ................. 707/200 |
| 2009/0184162 A1* | 7/2009 | Beck et al. .................. 235/380 |
| 2009/0192882 A1* | 7/2009 | Narahashi et al. ............ 705/10 |
| 2009/0228365 A1* | 9/2009 | Tomchek et al. ............. 705/21 |
| 2009/0327087 A1* | 12/2009 | Beck et al. .................. 705/21 |
| 2010/0312701 A1* | 12/2010 | Bosch et al. ................. 705/43 |
| 2011/0042178 A1* | 2/2011 | Luecking ..................... 194/302 |

FOREIGN PATENT DOCUMENTS

| | | | |
|---|---|---|---|
| JP | 2002-366394 | | 12/2002 |
| JP | 2003-67222 | | 3/2003 |
| JP | 2003-141075 | | 5/2003 |
| JP | 2006-259811 | | 9/2006 |
| JP | 20077140791 | * | 6/2007 |

* cited by examiner

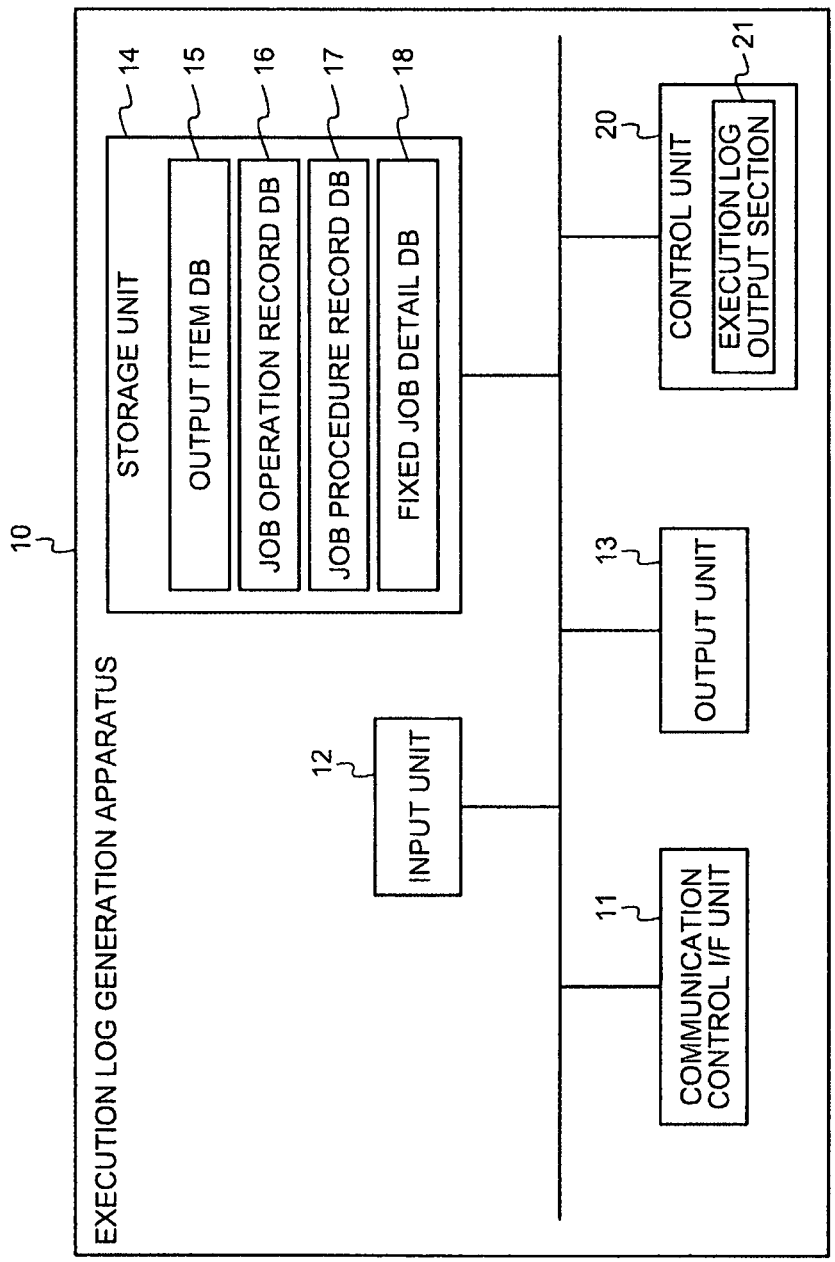

FIG.3

```
<JOB OPERATION name=SCREEN START-UP>
    <PROCESSED DATE AND TIME>2006/09/25 13:12:11</PROCESSED DATE AND TIME>
    <SLIP DATE>2006/09/25</SLIP DATE>
    <APPROVED DATE>2006/09/25</APPROVED DATE>
    <SLIP ISSUER>00998877</SLIP ISSUER>
    <APPROVER>00886655</APPROVER>
    <NAME OF ISSUING TERMINAL>GLO999V</NAME OF ISSUING TERMINAL>
    <ORDER>PX001122-00100</ORDER>
    <PRODUCT NAME>PERSONAL COMPUTER</PRODUCT NAME>
    <SUPPLIER>FUJITSU SHOJI</SUPPLIER>
    <SECTOR CODE>4708</SECTOR CODE>
    <PRICE>100,000 YEN</PRICE>
</JOB OPERATION>
```

FIG.4

```
<JOB PROCESS name=ORDER RECEIPT>
    <OUTPUT ITEM>
        <PROCESSED DATE AND TIME />
        <SLIP DATE />
        <APPROVED DATE />
        <ORDER />
        <PRODUCT NAME />
        <SUPPLIER />
        <PRICE />
    </OUTPUT ITEM>
    <JOB PROCEDURE name=ENTRY OF ORDER>
        <OUTPUT ITEM>
            <PROCESSED DATE AND TIME />
            <SLIP DATE />
            <APPROVED DATE />
            <SLIP ISSUER />
            <APPROVER />
            <SECTOR CODE />
            <PRICE />
        </OUTPUT ITEM>
        <JOB OPERATION name=SCREEN START-UP>
            <OUTPUT ITEM>
                <PROCESSED DATE AND TIME />
                <JOB OPERATION NAME />
                <SLIP ISSUER />
                <NAME OF ISSUING TERMINAL />
            </OUTPUT ITEM>
        </JOB OPERATION>
        <JOB OPERATION name=SLIP ISSUE>
            <OUTPUT ITEM>
                <PROCESSED DATE AND TIME />
                <SLIP ISSUER />
                <NAME OF ISSUING TERMINAL />
            </OUTPUT ITEM>
        </JOB OPERATION>
        <JOB OPERATION name=REQUEST FOR APPROVAL>
            <OUTPUT ITEM>
                <PROCESSED DATE AND TIME />
                <SLIP ISSUER />
                <NAME OF ISSUING TERMINAL />
            </OUTPUT ITEM>
            <COMPLETE PROCEDURE>
                <JOB PROCEDURE NAME>ENTRY OF ORDER</JOB PROCEDURE NAME>
            </COMPLETE PROCEDURE>
        </JOB OPERATION>
    </JOB PROCEDURE >
    <JOB PROCEDURE name=PASS>
     . . .
        <JOB OPERATION name=APPROVAL PROCESS>
            <OUTPUT ITEM>
                <PROCESSED DATE AND TIME />
                <SLIP ISSUER />
                <NAME OF ISSUING TERMINAL />
            </OUTPUT ITEM>
            <COMPLETE PROCEDURE>
                <JOB PROCEDURE NAME>PASS</JOB PROCEDURE NAME>
            </COMPLETE PROCEDURE>
            <COMPLETE JOB>
                <JOB PROCESS NAME>ACCEPTANCE OF ORDER</JOB PROCESS NAME>
            </COMPLETE JOB>
        </JOB OPERATION>
    </JOB PROCEDURE >
</JOB PROCESS>
 . . .
```

FIG.5

```
<JOB OPERATION name=SCREEN START-UP>
  <PROCESSED DATE AND TIME>2006/09/25 13:12:11</PROCESSED DATE AND TIME>
  <SLIP ISSUER>00998877</SLIP ISSUER>
  <NAME OF ISSUING TERMINAL>GLO999V</NAME OF ISSUING TERMINAL>
</JOB OPERATION>
```

FIG.6

```
<JOB PROCEDURE name=ENTRY OF ORDER>
  <JOB OPERATION name=REQUEST FOR APPROVAL>
    <PROCESSED DATE AND TIME>2006/09/25 13:12:11</PROCESSED DATE AND TIME>
    <SLIP DATE>2006/09/25</SLIP DATE>
    <APPROVED DATE>2006/09/25</APPROVED DATE>
    <SLIP ISSUER>00998877</SLIP ISSUER>
    <APPROVER>00886655</APPROVER>
    <SECTOR CODE>4708</SECTOR CODE>
    <PRICE>100,000 YEN</PRICE>
  </JOB OPERATION>
</JOB PROCEDURE>
```

FIG.7

```
<JOB PROCESS name=ACCEPTANCE OF ORDER>
  <JOB PROCEDURE name=ENTRY OF ORDER>
    <JOB OPERATION name=REQUEST FOR APPROVAL>
      <PROCESSED DATE AND TIME>2006/09/25 13:12:11</PROCESSED DATE AND TIME>
      <SLIP DATE>2006/09/25</SLIP DATE>
      <APPROVED DATE>2006/09/25</APPROVED DATE>
      <ORDER>PX001122-00100</ORDER>
      <PRODUCT NAME>PERSONAL COMPUTER</PRODUCT NAME>
      <SUPPLIER>FUJITSU SHOJI</SUPPLIER>
      <PRICE>100,000 YEN</PRICE>
    </JOB OPERATION>
  </JOB PROCEDURE>
</JOB PROCESS>
```

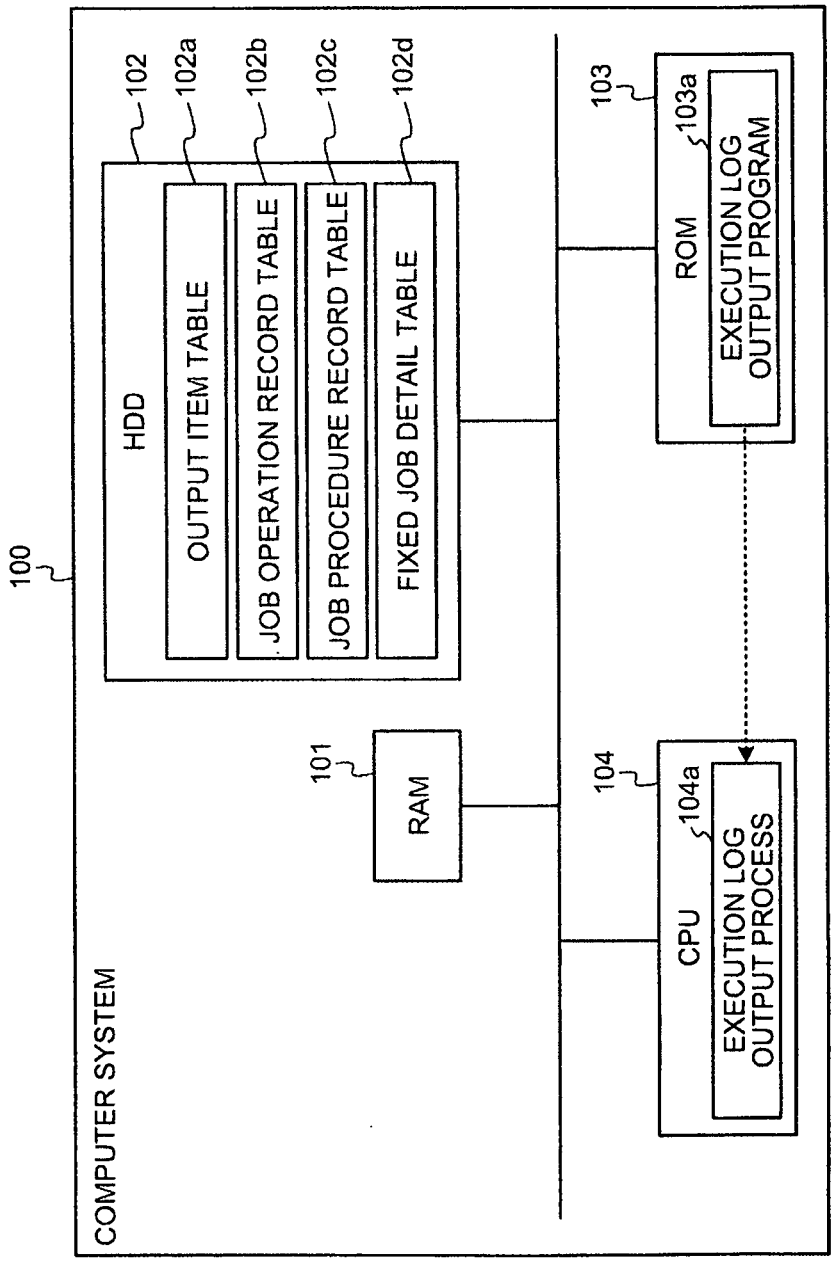

EXECUTION LOG GENERATION APPARATUS AND METHOD

CROSS-REFERENCE TO RELATED APPLICATION(S)

This application is a continuation of PCT international application Ser. No. PCT/JP2006/324965 filed on Dec. 14, 2006 which designates the United States, incorporated herein by reference, the entire contents of which are incorporated herein by reference.

FIELD

The embodiments discussed herein are directed to an execution log generation apparatus and method for generating an execution log upon receiving job operation data, provided for each job operation and indicating content of a job operation performed in a job procedure, from a job processing apparatus performing a plurality of job processes through a plurality of job procedures.

BACKGROUND

Conventionally, computer systems offering various job services perform a process and return a process result in response to a process request received from an external apparatus and the like, and also output and store therein an execution log. Examples of information to be output as an execution log include information indicating a result of a performed process and information indicating a process being performed.

Due to complexity of job services and improvement in a system's processing capability, each job service has been developed independently. Thus, a computer system performing such job services outputs an execution log in a unique format. Further, complexity of job services causes increase in volume and complexity of execution logs to be output.

For these reasons, execution logs to be output for each job service cannot be managed centrally. Further, when a user of a system refers to or analyzes execution logs of a plurality of job services, the user cannot obtain intended data using a reference process or an analysis process automatically performed in the system. This requires manual operations, causing a burden on the user.

For concrete example, to generate an audit log with execution logs, necessary information needs to be retrieved from each log. In this case, a determination standard needs to be set individually for each execution log due to differences in description format and other factors of job services. Thus, even when the reference process or the analysis process is performed automatically, intended data cannot be obtained. Accordingly, manual operations are required, causing a burden on a user. To address this, technologies are disclosed that reduce such burden on a user when the user refers to or analyzes execution logs of a plurality of job services.

For example, Japanese Laid-open Patent Publication No. H11-136428 discloses a technology of sorting logs to be output depending on an event process performed in each job service. Specifically, in an image processing apparatus such as a multifunction printer, logs are sorted to "notification event", "error event", and "warning event" depending on the degree of importance of each event to be output. Then, a user sets process content to be output as an execution log for each event. For example, "job state transition", "job completion", and the like are set for "notification event"; "toner off", "paper off", and the like are set for "error event"; and "out of disk space", "system shutdown", and the like are set for "warning event".

The image processing apparatus then outputs, for example, "job completion" as an execution log for "notification event" according to "event process" and "process content" sorted in this manner. Similarly, "paper off" and "toner off" are output for "error event", and "out of disk space" and "system shutdown" are output as execution logs for "warning event".

In Japanese Laid-open Patent Publication No. H11-136428 described above as a conventional technology, execution logs can be centrally managed according to the set events. However, the process content to be sorted to the events differ among job services (job processes), and therefore intended data cannot be obtained even when the reference process or the analysis process is performed automatically. This requires manual operations to obtain necessary (intended) data, causing a burden on a user.

SUMMARY

According to an aspect of the invention, an execution log generation apparatus generates an execution log upon receiving, for each job operation, job operation data indicating content of a job operation performed in a job procedure from a job processing apparatus that performs a plurality of job processes through a plurality of job procedures. The execution log generation apparatus includes a definition file holding unit that holds a definition file in which job operations performed in the job procedures are defined along a flow of the job processes and the job procedures, and in which output items to be output as execution logs for the each job operation are listed in a common format; and an execution log output unit that selects, by referring to the definition file held in the definition file holding unit, an output item of a job operation corresponding to the job operation data received from the job processing apparatus, and outputs an execution log from the job operation data in accordance with the selected output item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 2 is a schematic block diagram of the execution log generation apparatus depicted in FIG. 1;

FIG. 3 depicts an example of job operation data;

FIG. 4 depicts an example of information listed in a definition file;

FIG. 5 depicts an example of information stored in a job operation record DB;

FIG. 6 depicts an example of information stored in a job procedure record DB;

FIG. 7 depicts an example of information stored in a fixed job detail DB;

FIG. 10 is a schematic of a computer system executing an execution log generation program.

DESCRIPTION OF EMBODIMENT(S)

Preferred embodiments of an execution log generation apparatus according to the present invention are described in detail with reference to the accompanying drawings. Key terms used in the following embodiments, an outline and features of an execution log generation apparatus according to a first embodiment of the present invention, a structure of and a procedure performed by the execution log generation apparatus according to the first embodiment, and advantages of the first embodiment are described in this order, followed by another embodiment.

[a] First Embodiment
[Explanation of Terms]

First of all, key terms used in the present embodiment are explained. An "execution log generation apparatus" refers to an apparatus that generates execution logs of various processes performed by a selling system apparatus. The "execution log generation apparatus" outputs "processed date and time", "slip issuer", "name of issued terminal", and the like as execution logs of various processes, performed by the selling system apparatus in response to requests from a client apparatus or the like. Information about what processes have been performed through what types of job operations is output as execution logs. This arrangement can be used, for example, to submit an audit log to a third party performing an internal control audit or the like, or to investigate a cause of a system failure occurred.

The "execution log generation apparatus" is connected to the selling system apparatus and the client apparatus, and is implemented using a processing program called an enterprise service bus (ESB). Specifically, the "execution log generation apparatus" receives various requests made from the client apparatus to the selling system apparatus, and transfers the requests to the selling system apparatus. The "execution log generation apparatus" also receives process results (operation results) transmitted from the selling system apparatus to the client apparatus, and transfers the process results to the client apparatus. Thus, the "execution log generation apparatus" receives all the information communicated between the selling system apparatus and the client apparatus, obtains necessary information, and transfers the information to the destination, so as to control the communication. Although the present embodiment describes the "execution log generation apparatus" connected to the selling system apparatus", the present invention is not limited to this. For example, the "execution log generation apparatus" may be connected to a system of any type for any job, such as medical system equipment or an imaging system apparatus.

[Outline and Features of Execution Log Generation Apparatus]

Figure 1:
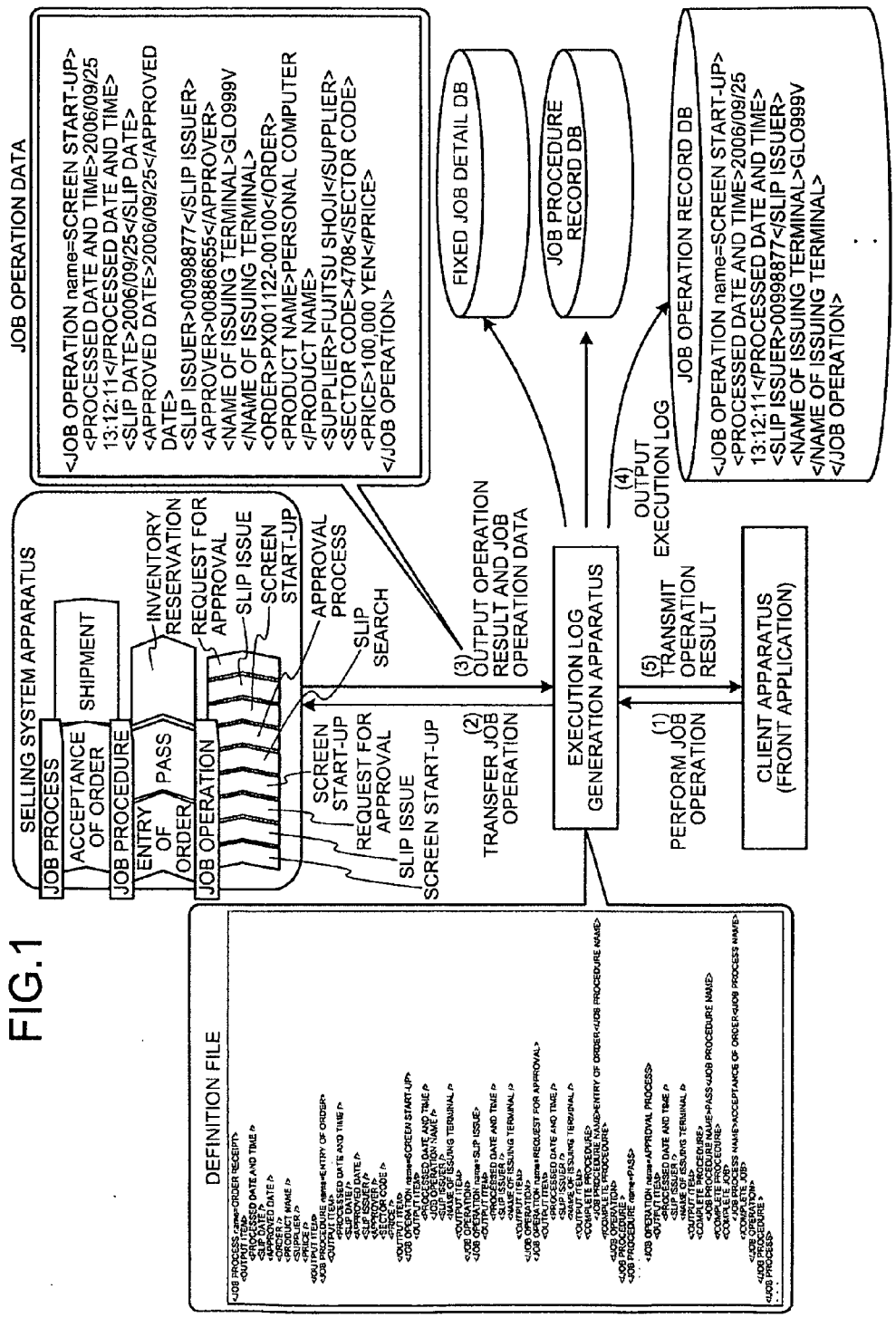
FIG. 1 is a drawing for explaining an outline and features of an execution log generation apparatus according to a first embodiment of the present invention.

Referring to FIG. 1, the following describes an outline and features of an execution log generation apparatus according to the first embodiment. FIG. 1 is a drawing for explaining an outline and features of an execution log generation apparatus according to the first embodiment.

As depicted in FIG. 1, the execution log generation apparatus is connected to a selling system apparatus and a client apparatus (front application) via a network so as to communicate with each other. The selling system apparatus performs a plurality of job processes through a plurality of job procedures. Specifically, the selling system apparatus performs a job process "acceptance of order" through job procedures "entry of order" and "pass". The selling system apparatus also performs a job process "shipment" through a job procedure "inventory reservation". Each of the job procedures includes job operations such as "screen start-up", "slip issue", and "request for approval".

With this arrangement, the execution log generation apparatus is configured to generate an execution log upon receiving job operation data, provided for each job operation and indicating content of a job operation performed in a job procedure, from a job processing apparatus. Particularly, the execution log generation apparatus has a main feature of being capable of reducing the burden on a user referring to or analyzing execution logs to be output in various job processes.

Concrete explanation is made below as to the main feature. The execution log generation apparatus holds a definition file in which job operations to be performed in a job procedure are defined along a flow of a plurality of job processes and a plurality of job procedures, and in which output items to be output as execution logs for each job operation are listed in a common format. Specifically, the execution log generation apparatus holds a definition file in which job operations to be performed in a job procedure are defined along a flow of a plurality of job processes and a plurality of job procedures, and in which output items to be output as execution logs for each job operation are described in an eXtensible Markup Language (XML) data format. For example, the execution log generation apparatus holds a definition file in which "processed date and time, slip issuer, and name of issuing terminal", and the like are listed in a common format, as output items to be output as execution logs for each job operation.

In this state, the execution log generation apparatus receives a job operation output (transmitted) from the client apparatus to the selling system apparatus, and then transfers the job operation to the selling system apparatus (see (1) and (2) in FIG. 1). Specifically, when the client apparatus connected to the selling system apparatus selects a job operation "screen start-up" of a job process "acceptance of order" from an operation list displayed on a monitor or the like, the client apparatus outputs (transmits) "screen start-up" as a job operation of a job procedure "entry of order" in the job process "acceptance of order" to the selling system apparatus. Then, the execution log generation apparatus once receives the job operation "screen start-up" transmitted from the client apparatus, and then transmits (transfers) the job operation to the selling system apparatus.

Upon receiving the job operation "screen start-up", the selling system apparatus performs the job operation "screen start-up", and outputs (transmits) an operation result and job operation data indicating the content of the job operation to the client apparatus via the execution log generation apparatus (see (3) in FIG. 1). For example, upon receiving the job operation "screen start-up", the selling system apparatus performs the job operation "screen start-up", and outputs (transmits) an operation result and job operation data that describes "job operation=screen start-up; processed date and time=2006/09/25, 13:12:11; slip date=2006/09/25; approved date=2006/09/25; slip issuer=00998877; approver=00886655; name of issuing terminal=GLO999V; order=PX001122-00100; product name=personal computer; supplier=Fujitsu Shoji; sector code=4708; and price= 100,000 yen" and the like in the XML data format (see FIG. 3) to the client apparatus via the execution log generation apparatus.

Upon receiving the operation result and the job operation data output from the selling system apparatus, the execution log generation apparatus transmits the operation result to the client apparatus. Further, by referring to the held definition file, the execution log generation apparatus selects an output item(s) of a job operation corresponding to the job operation data received from the selling system apparatus, and outputs an execution log(s) from the job operation data in accordance with the selected output item(s) (see (4) and (5) in FIG. 1).

More concrete explanation is made below with the above example. The execution log generation apparatus transmits the operation result output from the selling system apparatus to the client apparatus having performed the job operation. By referring to the definition file held in the XML data format, the execution log generation apparatus then selects output items of a job operation corresponding to the job operation data received from the selling system apparatus: "processed date and time, issued person, and name of issuing terminal". This selection is made from the job operation data of "screen start-up", i.e., "job operation=screen start-up; processed date and time=2006/09/25, 13:12:11; slip date=2006/09/25; approved date=2006/09/25; slip issuer=00998877; approver=00886655; name of issuing terminal=GLO999V; order=PX001122-00100; product name=personal computer; supplier=Fujitsu Shoji; sector code=4708; and price=100,000 yen" received together with the operation result. Then, the execution log generation apparatus outputs "processed date and time=2006/09/25, 13:12:11; slip issuer=00998877; and name of issuing terminal=GLO999V" in the XML data format as execution logs from the job operation data in accordance with the selected output items.

As such, the execution log generation apparatus according to the first embodiment can output execution logs of a plurality of job processes in a common format, and obtain intended (necessary) data automatically through the reference process or the analysis process. This makes it possible to reduce the burden on a user when referring to or analyzing execution logs to be output in job processes, as described in the main feature.

[Structure of Execution Log Generation Apparatus]

Referring to FIG. 2, the following describes a structure of the execution log generation apparatus depicted in FIG. 1. FIG. 2 is a schematic block diagram of the execution log generation apparatus according to the first embodiment. As depicted in FIG. 2, an execution log generation apparatus 10 includes a communication control I/F unit 11, an input unit 12, an output unit 13, a storage unit 14, and a control unit 20.

The communication control I/F unit 11 controls communication for exchanging various kinds of information between a selling system apparatus and a client apparatus both connected thereto. For example, the communication control I/F unit 11 receives a job operation output (transmitted) from the client apparatus and transmits the job operation to the selling system apparatus. The communication control I/F unit 11 also receives an operation result output (transmitted) from the selling system apparatus, and job operation data "job operation=screen start-up; processed date and time=2006/09/25, 13:12:11; slip date=2006/09/25; approved date=2006/09/25; slip issuer 00998877; approver=00886655; name of issuing terminal=GLO999V; order=PX001122-00100; product name=personal computer; supplier=Fujitsu Shoji; sector code=4708; and price=100,000 yen" as depicted in FIG. 3, and transmits the received operation result to the client apparatus. FIG. 3 depicts an example of job operation data.

The input unit 12 includes a keyboard, a mouse, and a microphone, and receives input of various kinds of information. For example, the input unit 12 receives an operation for referring to an execution log output from the execution log generation apparatus 10. The output unit 13 includes a monitor (or a display or a touch panel) and a speaker, and outputs various kinds of information. For example, according to an execution log reference request received at the input unit 12, the output unit 13 outputs and displays an execution log to be stored.

The storage unit 14 stores therein data and programs necessary for various processes performed by the control unit 20. The storage unit 14 includes an output item database (DB) 15, a job operation record database (DB) 16, a job procedure record database (DB) 17, and a fixed job detail database (DB) 18 as elements closely related to the present invention.

The output item DB 15 holds a definition file in which job operations to be performed in a job procedure are defined along a flow of a plurality of job processes and a plurality of job procedures, and in which output items to be output as execution logs for each job operation, output items to be output as execution logs for each job procedure, and output items to be output as execution logs for each job processes are listed in a common format.

For example, the output item DB 15 holds a definition file in which job operations to be performed in a job procedure are defined along a flow of a plurality of job processes and a plurality of job procedures, and in which output items "processed date and time, slip issuer, and name of issuing terminal" to be output as execution logs for each job operation; output items "processed date and time, slip date, approved date, slip issuer, approver, sector code, and price" to be output as execution logs for each job procedure; and output items "processed date and time, slip date, approved date, order, product name, supplier, and price" to be output as execution logs for each job process are listed in a common format defined in the XML data format, as depicted in FIG. 4. The output item DB 15 corresponds to a "definition file holding procedure" recited in the claims, and FIG. 4 depicts an example of information listed in a definition file.

The job operation record DB 16 stores therein an execution log output from an execution log output section 21 (described later), as an output item of a job operation corresponding to the job operation data received from the job processing apparatus. Specifically, as depicted in FIG. 5, the job operation record DB 16 stores therein, under "job operation name=screen start-up", execution logs output in the XML data format for the job operation: "processed date and time=2006/09/25, 13:12:11; slip issuer=00998877; name of issuing terminal=GLO999V" and other information. FIG. 5 depicts an example of information stored in the job operation record DB.

The job procedure record DB 17 stores therein execution logs output from the execution log output section 21 (described later) as output items of a job procedure corresponding to the job operation data received from the job processing apparatus. Specifically, as depicted in FIG. 6, the job procedure record DB 17 stores therein, under "job procedure name=entry of order", execution logs output in the XML data format for the job procedure: "job operation name=request for approval; processed date and time=2006/09/25, 13:12:11; slip date=2006/09/25; approved date=2006/09/25; slip issuer=00998877; approver=00886655; sector code=4708; and price=100,000 yen" and other information. FIG. 6 depicts an example of information stored in the job procedure record DB.

The fixed job detail DB 18 stores therein execution logs output from the execution log output section 21 (described later), as output items of a job process corresponding to the job operation data received from the job processing apparatus. Specifically, as depicted in FIG. 7, the fixed job detail DB 18 stores therein, under "job process name=acceptance of order", execution logs output in the XML data format for the job process: "job procedure name=entry of order; job operation name=request for approval; processed date and time=2006/09/25, 13:12:11; slip date=2006/09/25; approved date=2006/09/25; order=PX001122-00100; product name=personal computer; supplier=Fujitsu Shoji; sector code=4708; and price=100,000 yen". FIG. 7 depicts an example of information to be stored in the fixed job detail DB.

The control unit 20 includes an internal memory that stores therein a control program such as an operating system (OS) or the like, a program specifying various procedures, and predetermined data. The control unit 20 also includes the execution log output section 21 as an element closely related to the present invention. With these elements, the execution log output section 21 performs various processes.

When the job operation data received from the job processing apparatus is the final job operation of the final job procedure in a job process, the execution log output section 21 refers to a definition file held in the output item DB 15, and outputs an output item(s) of a job operation corresponding to the job operation data and an output item(s) of a job procedure corresponding to the job operation data, as their respective execution logs. The execution log output section 21 then selects an output item(s) of a job process corresponding to the job operation data, and outputs an execution log(s) from the job operation data in accordance with the selected output item(s).

Concrete explanation is made below with the above example. As depicted in FIG. 4, in the job process "acceptance of order", "request for approval" is the final job operation of the job procedure "entry of order". Further, "pass" is the final job procedure in the job process "acceptance of order". Thus, when receiving a job operation "approval process" of the job procedure "pass" in the job process "acceptance of order", the execution log output section 21 outputs three types of execution logs: job process, job procedure, and job operation in the XML data format. Further, when receiving job operation data, i.e., the job operation "request for approval" of the job procedure "entry of order" in the job process "acceptance of order", the execution log output section 21 outputs two types of execution logs: job procedure and job operation. On the other hand, when receiving other job procedure such as "entry of order", the execution log output section 21 outputs one type of execution log: job procedure.

For example, assume that the execution log output section 21 receives job operation data, i.e., a job operation "approval process" of a job procedure "pass" in a job process "acceptance of order" ("job operation=approval process; processed date and time=2006/10/25, 13:12:11; slip date=2006/10/25; approved date=2006/10/25; slip issuer=00112233; approver=00445566; name of issuing terminal=ABO111V; order=PY112233-00100; product name=personal computer; supplier=Fujitsu Shoji; sector code=9999; and price=3,000,000 yen). In this case, by referring to a definition file held in the output item DB 15, the execution log output section 21 obtains, from the job operation data, "processed date and time=2006/10/25, 13:12:11; slip issuer=00112233; and name of issuing terminal=ABO111V" that correspond to output items "processed date and time, slip issuer, and name of issuing terminal" of a job operation corresponding to the job operation data. The execution log output section 21 then outputs the obtained data in the XML data format as execution logs to the job operation record DB 16.

Further, by referring to a definition file held in the output item DB 15, the execution log obtains, from the job operation data, "job operation name=approval process; processed date and time=2006/10/25, 13:12:11; slip date=2006/10/25; approved date=2006/10/25; slip issuer=00112233; approver=00445566; sector code=9999; and price=3,000,000 yen" that correspond to output items "job operation name, processed date and time, slip date, approved date, slip issuer, sector code, and price" of a job procedure corresponding to the job operation data, so as to output the obtained data as execution logs in the XML data format to the job procedure record DB 17. Further, the execution log output section 21 obtains, from the job operation data, "job procedure name=pass; job operation name=approval process; processed date and time=2006/10/25, 13:12:11; slip date=2006/10/25; approved date=2006/10/25; order=PY112233-00100; product name=personal computer; supplier=Fujitsu Shoji; sector code=9999; and price=3,000,000 yen" that correspond to output items "job procedure name, job operation name, processed date and time, slip date, approved date, order, product name, supplier, sector code, and price" of a job process corresponding to the job operation data, so as to output the obtained data as execution logs in the XML data format to the fixed job detail DB 18. The execution log output section 21 corresponds to an "execution log output procedure" recited in the claims.

[Process performed by Execution Log Generation Apparatus]

Figure 8:
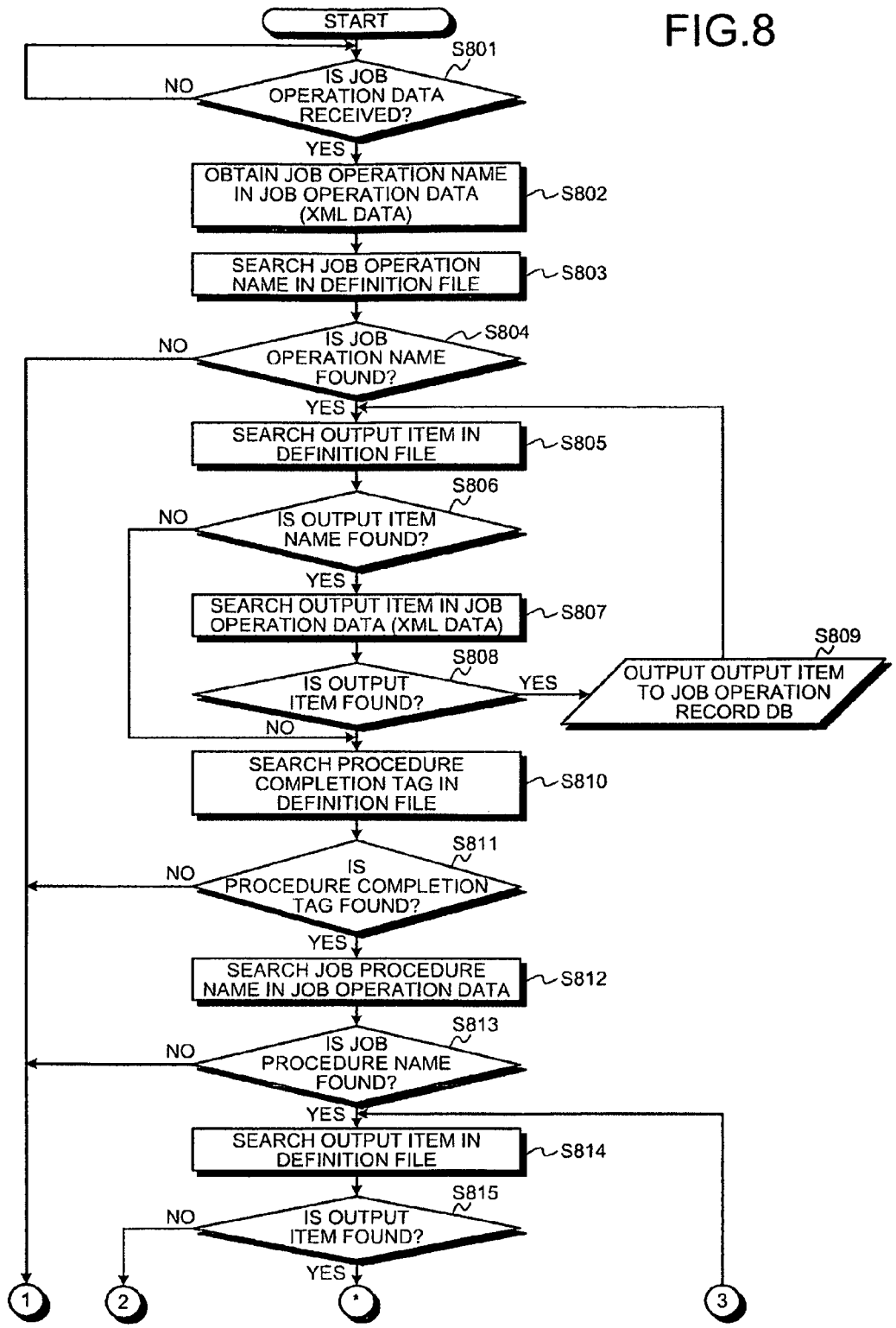
FIG. 8 is a flowchart of an execution log generation process performed by the execution log generation apparatus according to the first embodiment.
Figure 9:
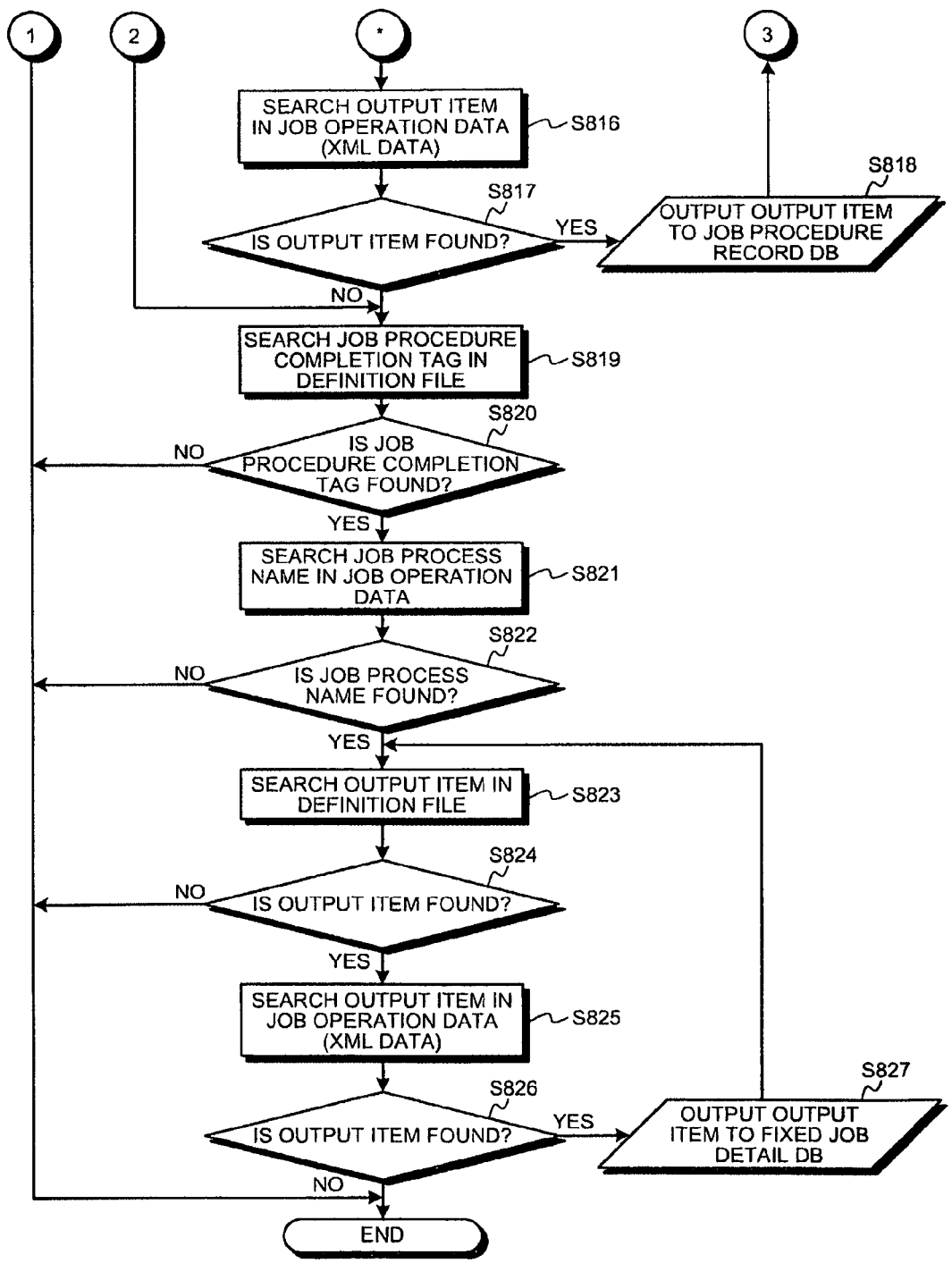
FIG. 9 is a flowchart of the execution log generation process performed by the execution log generation apparatus according to the first embodiment.

Referring to FIGS. 8 and 9, the following describes a process performed by the execution log generation apparatus. FIGS. 8 and 9 are flowcharts depicting a process flow for generating (outputting) an execution log in the execution log generation apparatus according to the first embodiment.

As depicted in FIG. 8, upon receiving job operation data (XML data) after the selling system apparatus performs a job operation (Yes at Step S801), the execution log output section 21 of the execution log generation apparatus obtains a job operation name from the received job operation data (Step S802).

The execution log output section 21 then searches the same job operation name as the obtained job operation name in a definition file stored in the output item DB 15 (Step S803). If the same job operation name is found in the definition file (Yes at Step S804), the execution log output section 21 searches an output item of the job operation name in the definition file (Step S805).

If the output item is found (Yes at Step S806), the execution log output section 21 searches the same output item as the found output item in the received job operation data (Step S807).

If the output item is found (Yes at Step S808), the execution log output section 21 outputs the found output item as an execution log to the job operation record DB 16 (Step S809), and then the system control goes back to Step S805.

On the contrary, if the output item is not found in the definition file (No at Step S806), or if the output item is not found in the received job operation data (No at Step S808), the execution log output section 21 searches a procedure completion tag in the definition file stored in the output item DB 15 (Step S810).

If the procedure completion tag is found in the definition file (Yes at Step S811), the execution log output section 21 searches a job procedure name in the received job operation data (Step S812).

If the job procedure name is found in the job operation data (Yes at Step S813), the execution log output section 21 searches an output item of the job operation name in the definition file (Step S814). Then, if the output item is found (Yes at Step S815), the execution log output section 21 searches the same output item as the found output item in the job operation data as depicted in FIG. 9 (Step S816).

If the output item is found (Yes at Step S817), the execution log output section 21 outputs the found output item as an execution log to the job procedure record DB 17 (Step S818), and the system control goes back to Step S814.

On the contrary, if the output item is not found in the definition file (No at Step S815), or if the output item is not found in the received job operation data (No at Step S817), the execution log output section 21 searches a job procedure completion tag in the definition file stored in the output item DB 15 (Step S819).

If the job procedure completion tag is found in the definition file (Yes at Step S820), the execution log output section 21 searches a job process name in the received job operation data (Step S821).

If the job process name is found in the job operation data (Yes at Step S822), the execution log output section 21 searches an output item of the job process name in the definition file (Step S823). Then, if the output item is found (Yes at Step S824), the execution log output section 21 searches the same output item as the found output item in the job operation data (Step S825).

If the output item is found (Yes at Step S826), the execution log output section 21 outputs the found output item as an execution log to the fixed job detail DB 18 (Step S827), and the system control goes back to Step S823.

On the contrary, if the output item is not found in the definition file (No at Step S824), or if the output item is not found in the received job operation data (No at Step S826), the execution log output section 21 terminates the processing.

The execution log output section 21 also terminates the processing if the job operation name is not found (No at Step S804), if the procedure completion tag is not found in the definition file (No at Step S811), if the job procedure name is not found in the job operation data (No at Step S813), if the job procedure completion tag is not found in the definition file (No at Step S820), or if the job process name is not found in the job operation data (No at Step S822).

[Advantages of First Embodiment]

As described above, according to the first embodiment, a definition file is held in which job operations to be performed in a job procedure are defined along a flow of a plurality of job processes and a plurality of job procedures, and in which output items to be output as execution logs for each job operation are listed in a common format. Then, referring to the held definition file, an output item(s) of a job operation corresponding to the job operation data received from the selling system apparatus are selected, and an execution log(s) are output from the job operation data in accordance with the selected output item(s). Thus, execution logs of a plurality of job processes can be output in a common format, so that intended (necessary) data can be obtained automatically through the reference process or the analysis process. This reduces the burden on a user when the user refers or analyzes execution logs output in various job processes.

For example, detailed operation logs of job operations such as "screen start-up" and "slip issue" for performing a job can be output as execution logs. Further, by analyzing these execution logs, more detailed information can be obtained. In addition, logs of a plurality of job processes can be output in a common format. As a result, an audit log can be obtained quickly to perform an internal control audit, for example.

According to the first embodiment, when the job operation data received from the selling system apparatus is the final job operation of a job procedure, by referring to the held definition file, an output item(s) of a job operation corresponding to the job operation data are output as an execution log(s). Further, an output item(s) of a job procedure corresponding to the job operation data are selected, and an execution log(s) are output from the job operation data in accordance with the selected output item(s). Thus, execution logs of a plurality of job processes can be output in a common format, so that execution logs can be output for various types of job procedures in job processes.

For example, as to an execution log of a job procedure "entry of order" in a job process "acceptance of order", necessary information can be obtained from job data of a job operation "request for approval" for performing the procedure "entry of order" and output. Similarly, as to an execution log of a job procedure "inventory reservation" in a job process "shipment", necessary information can be obtained from job data of a job operation "request for approval" for performing the procedure "inventory reservation" and output. By analyzing these logs, more detailed information can be obtained.

According to the first embodiment, when job operation data received from the selling system apparatus is the final job operation of the final job procedure in a job process, by referring to the held definition file, an output item(s) of a job operation corresponding to the job operation data and an output item(s) of a job procedure corresponding to the job operation data are output as their respective execution logs. Further, an output item(s) of a job process corresponding to the job operation data are selected, and an execution log(s) are output from the job operation data in accordance with the selected output item(s). Thus, execution logs of a plurality of job processes can be output in a common format, so that more detailed information may be put in execution logs of a plurality of job processes and output.

For example, as to an execution log of a job process "acceptance of order", necessary information can be obtained from job data of a job operation "screen start-up" and output. This allows more detailed information to be put in execution logs of a plurality of job processes and output.

[b] Second Embodiment

The foregoing describes one embodiment of the present invention. The present invention may be embodied in various different forms other than the above embodiment. The following describes another embodiment of the present invention segmented to: (1) Generation of Execution Log, (2) Job System, (3) System Configuration, and (4) Computer Program.

(1) Generation of Execution Log

The first embodiment describes a process flow for outputting three types of execution logs: job operation, job procedure, and job process, for example. The present invention is not limited to this, and one or more types of execution logs may be output. For example, only a job operation may be output, or a job operation and a job procedure may be output.

(2) Job System

The first embodiment describes an arrangement that an execution log(s) are output for job processes performed in the selling system apparatus. The present invention is not limited to this, and an execution log(s) may be output for other job processes performed in a system apparatus such as medical system equipment. Further, by storing a plurality of definition files, an execution log(s) may be output for job processes performed in a plurality of system apparatuses, not only in a single system apparatus.

(3) System Configuration

As to the processes described in the first embodiment, all or part of the processes described as being performed automatically (e.g., job operation processes performed by the selling system apparatus) can be performed manually. Alternatively, as to the processes described as being performed manually, all or part of the processes can be performed automatically by known methods. In addition, processing procedures, controlling procedures, specific names, and information including various kinds of data and parameters described in the description and the accompanying drawings (e.g., FIGS. 3 to 7) can be changed in any way unless otherwise specified.

Constituting elements of devices depicted in the drawings are ideational functions, and their physical arrangements are not necessarily the same as those depicted in the drawings. Thus, specific forms of distribution and integration of the devices are not limited to those depicted in the drawings, and all or part of the devices can be configured to be distributed and integrated functionally and physically by given units (e.g., the job operation record DB 16 and the job procedure record DB 17 may be integrated) according to various loads and use conditions. Further, all or any part of processing functions performed by each device can be implemented by a central processing unit (CPU) or a computer program interpretable and executable by the CPU, or implemented by hardware using wired logic.

(4) Computer Program

The processes described in the first embodiment can be realized by executing a computer program prepared in advance in a computer system such as a personal computer or a workstation. As an another embodiment, the following describes a computer system that executes a computer program including functions similar to those described in the first embodiment.

FIG. 10 is a schematic of a computer system that executes an execution log generation program. As depicted in FIG. 10, a computer system 100 includes a random access memory (RAM) 101, a hard disk drive (HDD) 102, a read only memory (ROM) 103, and a CPU 104. The ROM 103 stores therein a computer program including functions similar to those described in the first embodiment, i.e., an execution log output program 103a, in advance as depicted in FIG. 10.

The CPU 104 reads and executes the execution log output program 103a, thereby completing an execution log output process 104a as depicted in FIG. 10. The execution log output process 104a corresponds to the execution log output section 21 depicted in FIG. 2.

The HDD 102 includes an output item table 102a that holds definition files listed in a common format defined in the XML data format; a job operation record table 102b that stores therein an execution log output as an output item of a job operation; a job procedure record table 102c that stores therein an execution log output as an output item of a job procedure; and a fixed job detail table 102d that stores therein an execution log output as an output item of a job process. The output item table 102a, the job operation record table 102b, the job procedure record table 102c, and the fixed job detail table 102d correspond to the output item DB 15, the job operation record DB 16, the job procedure record DB 17, and the fixed job detail DB 18 depicted in FIG. 2, respectively.

The execution log output program 103a need not be stored in advance in the ROM 103. For example, the execution log output program 103a may be stored in advance in: a "portable physical medium" such as a flexible disk (FD), a compact disk read only memory (CD-ROM), a magnetooptical (MO) disk, a digital versatile disk (DVD disk), or an integrated circuit (IC) card inserted to the computer system 100; a "fixing physical medium" such as a HDD installed inside or outside the computer system 100; or, "another computer system" connected to the computer system 100 via a public line, the Internet, a local area network (LAN), a wide area network (WAN), or the like. The computer system 100 may read the computer program from such medium and execute the computer program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer readable storage medium containing instructions for an execution log generation that generates an execution log upon receiving, for each job operation, job operation data indicating content of a job operation performed in a job procedure from a job processing apparatus that performs a plurality of job processes through a plurality of job procedures, wherein the instructions, when executed by a computer, cause the computer to perform:

holding a definition file in which job operations performed in the job procedures are defined along a flow of the job processes and the job procedures, and in which first output items to be output as execution logs for the each job operation are listed in a common format;

selecting, by referring to the definition file held in the holding, the first output item of a job operation corresponding to the job operation data received from the job processing apparatus; and outputting an execution log from the job operation data in accordance with the selected first output item.

2. The non-transitory computer readable storage medium according to claim 1, wherein the holding includes holding the definition file in which second output items to be output as the execution logs for each of the job procedures are further listed in a common format in respect to a final job operation in any one of the job procedures, the selecting includes further selecting, when the job operation data received from the job processing apparatus is data of the final job operation in any one of the job procedures, the second output item of the job procedure corresponding to the received job operation data by referring to the definition file, and the outputting includes further outputting the execution log from the job operation data in accordance with the selected second output item.

3. The non-transitory computer readable storage medium according to claim 2, wherein the holding includes holding the definition file in which third output items to be output as the execution logs for each of the job processes are further listed in a common format in respect to a final job operation of a final job procedure in any one of the job processes, the selecting includes further selecting, when the job operation data received from the job processing apparatus is data of the final job operation of the final job procedure in any one of the job processes, the third output item of the job process corresponding to the received job operation data by referring to the definition file, and the outputting includes further outputting the execution log from the job operation data in accordance with the selected third output item.

4. An execution log generation apparatus for generating an execution log upon receiving, for each job operation, job operation data indicating content of a job operation performed in a job procedure from a job processing apparatus that performs a plurality of job processes through a plurality of job procedures, the execution log generation apparatus comprising:
  a definition file holding unit that holds a definition file in which job operations performed in the job procedures are defined along a flow of the job processes and the job procedures, and in which first output items to be output as execution logs for the each job operation are listed in a common format;
  an execution log output unit that selects, by referring to the definition file held in the definition file holding unit, the first output item of a job operation corresponding to the job operation data received from the job processing apparatus, and outputs an execution log from the job operation data in accordance with the selected first output item.

5. The execution log generation apparatus according to claim 4, wherein
  the definition file holding unit holds the definition file in which second output items to be output as the execution logs for each of the job procedures are further listed in a common format in respect to a final job operation in any one of the job procedures, and
  the execution log output unit selects, when the job operation data received from the job processing apparatus is data of final job operation in any one of the job procedures, the second output item of the job procedure corresponding to the received job operation data by referring to the definition file, and outputs the execution log from the job operation data in accordance with the selected second output item.

6. The execution log generation apparatus according to claim 5, wherein
  the definition file holding unit holds the definition file in which third output items to be output as the execution logs for each of the job processes are further listed in a common format in respect to a final job operation of a final job procedure in any one of the job processes,
  the execution log output unit selects, when the job operation data received from the job processing apparatus is data of the final job operation of the final job procedure in any one of the job processes, the third output item of the job process corresponding to the received job operation data by referring to the definition file, and outputs the execution log from the job operation data in accordance with the selected third output item.

7. An execution log generation method for generating an execution log upon receiving, for each job operation, job operation data indicating content of a job operation performed in a job procedure from a job processing apparatus that performs a plurality of job processes through a plurality of job procedures, the execution log generation method comprising:
  holding a definition file in which job operations performed in the job procedures are defined along a flow of the job processes and the job procedures, and in which the output items to be output as execution logs for the each job operation are listed in a common format;
  selecting, by referring to the definition file held in the holding, the first output item of a job operation corresponding to the job operation data received from the job processing apparatus; and
  outputting an execution log from the job operation data in accordance with the selected output item.

8. The execution log generation method according to claim 7, wherein
  the holding includes holding the definition file in which second output items to be output as the execution logs for each of the job procedures are further listed in a common format in respect to a final job operation in any one of the job procedures,
  the selecting includes further selecting, when the job operation data received from the job processing apparatus is data of the final job operation in any one of the job procedures, the second output item of the job procedure corresponding to the received job operation data by referring to the definition file, and
  the outputting includes further outputting the execution log from the job operation data in accordance with the selected second output item.

9. The execution log generation method according to claim 8, wherein
  the holding includes holding the definition file in which third output items to be output as the execution logs for each of the job processes are further listed in a common format in respect to a final job operation of a final job procedure in any one of the job processes,
  the selecting includes further selecting, when the job operation data received from the job processing apparatus is data of the final job operation of the final job procedure in any one of the job processes, the third output item of the job process corresponding to the received job operation data by referring to the definition file, and
  the outputting includes further outputting the execution log from the job operation data in accordance with the selected third output item.

* * * * *